US009298660B2

(12) United States Patent
Lin

(10) Patent No.: US 9,298,660 B2
(45) Date of Patent: Mar. 29, 2016

(54) SUPER SPEED USB HUB AND TRAFFIC MANAGEMENT METHOD THEREOF

(71) Applicant: FARADAY TECHNOLOGY CORPORATION, Hsinchu (TW)

(72) Inventor: Liang-Ting Lin, Kaohsiung (TW)

(73) Assignee: Faraday Technologies Corp., Science-Based Industrial Park, Hsin-Chu (TW)

( * ) Notice: Subject to any disclaimer, the term of this patent is extended or adjusted under 35 U.S.C. 154(b) by 583 days.

(21) Appl. No.: 13/727,796

(22) Filed: Dec. 27, 2012

(65) Prior Publication Data
US 2014/0149628 A1     May 29, 2014

(30) Foreign Application Priority Data
Nov. 29, 2012   (TW) .............................. 101144745 A

(51) Int. Cl.
*G06F 13/40*      (2006.01)

(52) U.S. Cl.
CPC .... *G06F 13/4059* (2013.01); *G06F 2213/0042* (2013.01)

(58) Field of Classification Search
CPC ..................... G06F 13/4059; G06F 2213/0042
See application file for complete search history.

(56) References Cited

U.S. PATENT DOCUMENTS

| 8,151,018 | B2 | 4/2012 | Mohanty et al. |
| 8,200,856 | B2 | 6/2012 | Guo et al. |
| 2005/0033876 | A1 | 2/2005 | Hanes et al. |
| 2005/0071733 | A1* | 3/2005 | Fukae et al. .................. 714/776 |
| 2006/0179144 | A1* | 8/2006 | Nagase ......................... 709/226 |
| 2008/0028113 | A1* | 1/2008 | Guo et al. ..................... 710/104 |
| 2010/0235655 | A1 | 9/2010 | Tauscher et al. |
| 2011/0099308 | A1 | 4/2011 | Garney et al. |
| 2011/0179201 | A1* | 7/2011 | Monks et al. .................. 710/60 |
| 2011/0208891 | A1 | 8/2011 | Meyers |
| 2011/0208892 | A1 | 8/2011 | Meyers |
| 2012/0059964 | A1* | 3/2012 | Foster ............................ 710/300 |
| 2012/0102255 | A1* | 4/2012 | Moore ........................... 710/313 |
| 2013/0346650 | A1* | 12/2013 | Uehara .......................... 710/63 |

FOREIGN PATENT DOCUMENTS

| TW | 200521694 | 7/2005 |
| TW | 200635133 | 10/2006 |
| TW | 200815994 | 4/2008 |

OTHER PUBLICATIONS

Taiwan Patent Office, "Office Action," Feb. 9, 2015.

* cited by examiner

*Primary Examiner* — Nimesh G Patel
(74) *Attorney, Agent, or Firm* — Winston Hsu; Scott Margo

(57) ABSTRACT

A super speed USB hub includes an upstream port, a plurality of device ports, a transaction dispatching unit, a downstream buffer, a hub local packet parser, a traffic control unit, and a forwarding unit. The transaction dispatching unit is used for receiving a plurality of packets from a USB host, wherein the plurality of packets comprise a plurality of downstream packets and a hub command packet. If the hub command packet contains a traffic management command, the hub local packet parser generates a selected target and a control mode according to the traffic management command. The traffic control unit is used for managing a downstream packet corresponding to the selected target among the plurality of downstream packets in the downstream buffer according to the selected target and the control mode.

16 Claims, 8 Drawing Sheets

SUPER SPEED USB HUB AND TRAFFIC MANAGEMENT METHOD THEREOF

This application claims the benefit of Taiwan Patent Application No. 101144745, filed Nov. 29, 2012, the subject matter of which is incorporated herein by reference.

FIELD OF THE INVENTION

The present invention relates to a hub and a controlling method thereof, and more particularly to a super speed USB hub and a traffic management method thereof.

BACKGROUND OF THE INVENTION

Universal Serial Bus (USB) is an industry standard widely used in a variety of electronic products. Generally, a USB device may be connected to a USB host. After the USB device is connected to the USB host, the USB device may be controlled by the USB host, and the data from the USB device may be received by or transmitted through the USB host.

Moreover, a USB hub is connected between the USB host and the USB device. Through the USB hub, the USB host can be in communication with more USB devices to control these USB devices. FIG. 1 is a schematic functional diagram illustrating the architecture of a conventional USB hub. As shown in FIG. 1, the USB hub 100 comprises an upstream port 102, a control unit 104, a repeater/forwarder 106, and N device ports 121~12N. The upstream port 102 is connected to a USB host (not shown). The N device ports 121~12N are selectively connected to N USB devices (not shown). The repeater/forwarder 106 is connected to the control unit 104, the upstream port 102 and the N device ports 121~12N. The USB hub 100 is a USB 2.0 hub. The USB 2.0 is also referred as a high speed USB.

Generally, the packet from the USB host is forwarded by the USB hub 100 through a broadcast system. It is assumed that N USB devices are plugged into the USB hub 100. After a first packet from the USB host is transmitted to the repeater/forwarder 106 through the upstream port 102, the repeater/forwarder 106 creates N copies of the first packet and sends the N copies of the first packet to the N device ports 121~12N.

The first packet has an address field correlated with one of the N USB devices. When the first packet is received by the USB devices which are not correlated with the address field, these USB devices have no response. On the other hand, when the first packet is received by the correlated USB device (e.g. the first USB device), the first USB device has a transaction response to the USB host. Moreover, during the USB host waits for the transaction response from the first USB device, the USB host does not issue a new packet.

From the above discussions, the USB host may issue a new packet after the transaction response from the first USB device is received. Consequently, the packet from the USB host is not blocked by the USB hub 100. If any packet is blocked by the USB hub 100, the USB device does not make any response, and the USB host fails to generate the new packet. In other words, the USB hub 100 using the broadcast system to transfer the packet has no traffic management system.

SUMMARY OF THE INVENTION

A first embodiment of the present invention provides a super speed USB hub connected between a USB host and a plurality of USB devices. The super speed USB hub includes an upstream port, a plurality of device ports, a transaction dispatching unit, a downstream buffer, a hub local packet parser, a traffic control unit, and a forwarding unit. The upstream port is connected to the USB host. The plurality of device ports are connected to the plurality of USB devices, respectively. The transaction dispatching unit is used for receiving a plurality of packets from the USB host, wherein the plurality of packets comprise a plurality of downstream packets and a hub command packet. The downstream buffer is used for temporarily storing the plurality of downstream packets. The hub local packet parser is used for receiving the hub command packet. If the hub command packet contains a traffic management command, the hub local packet parser generates a selected target and a control mode according to the traffic management command. The traffic control unit is used for managing a downstream packet corresponding to the selected target among the plurality of downstream packets in the downstream buffer according to the selected target and the control mode. The forwarding unit is used for forwarding the plurality of downstream packets from the traffic control unit to corresponding device ports.

A second embodiment of the present invention provides a traffic management method for a super speed USB hub. Firstly, a hub command packet is received. By analyzing the hub command packet, a selected target and a control mode are determined. A plurality of downstream packets are temporarily stored into a downstream buffer. In addition, a downstream packet corresponding to the selected target among the plurality of downstream packets in the downstream buffer is managed According to the control mode.

A third embodiment of the present invention provides a super speed USB hub connected between a USB host and a plurality of USB devices. The super speed USB hub includes an upstream port, a plurality of device ports, a transaction dispatching unit, an upstream buffer, a hub local packet parser, and a traffic control unit. The upstream port is connected to the USB host. The plurality of device ports are connected to the plurality of USB devices, respectively. The transaction dispatching unit is used for receiving a hub command packet from the USB host. The upstream buffer is used for temporarily storing a plurality of upstream packets from the plurality of USB devices. The hub local packet parser is used for receiving the hub command packet. If the hub command packet contains a traffic management command, the hub local packet parser generates a selected target and a control mode according to the traffic management command. The traffic control unit is used for managing an upstream packet corresponding to the selected target among the plurality of upstream packets in the upstream buffer according to the selected target and the control mode.

A fourth embodiment of the present invention provides a traffic management method for a super speed USB hub. Firstly, a hub command packet is received. By analyzing the hub command packet, a selected target and a control mode are determined. A plurality of upstream packets are temporarily stored into an upstream buffer. An upstream packet corresponding to the selected target among the plurality of upstream packets in the upstream buffer is managed according to the control mode.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

USB 3.0 is also referred as a super speed USB. According to the USB 3.0 specification, the USB 3.0 host can sequentially issue a plurality of packets to the USB device ports in order to perform multiple transactions. The present invention provides a USB 3.0 hub. In the USB 3.0 hub, the packet from the USB host is not forwarded through the conventional broadcast system. On the other hand, the USB 3.0 hub of the present invention utilizes a routing mechanism to forward the packet in order to achieve the traffic control.

Figure 1:
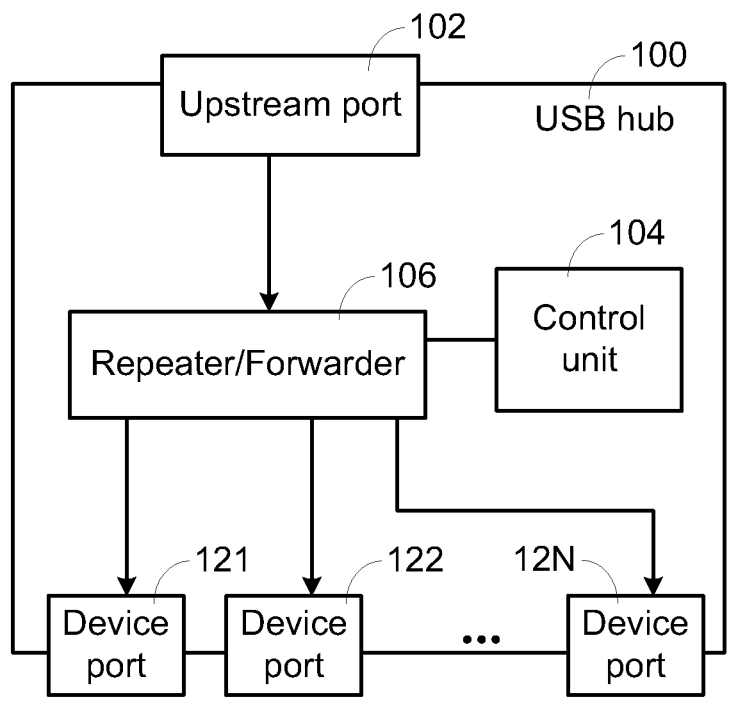
FIG. 1 (prior art) is a schematic functional diagram illustrating the architecture of a conventional USB hub.
Figure 2:
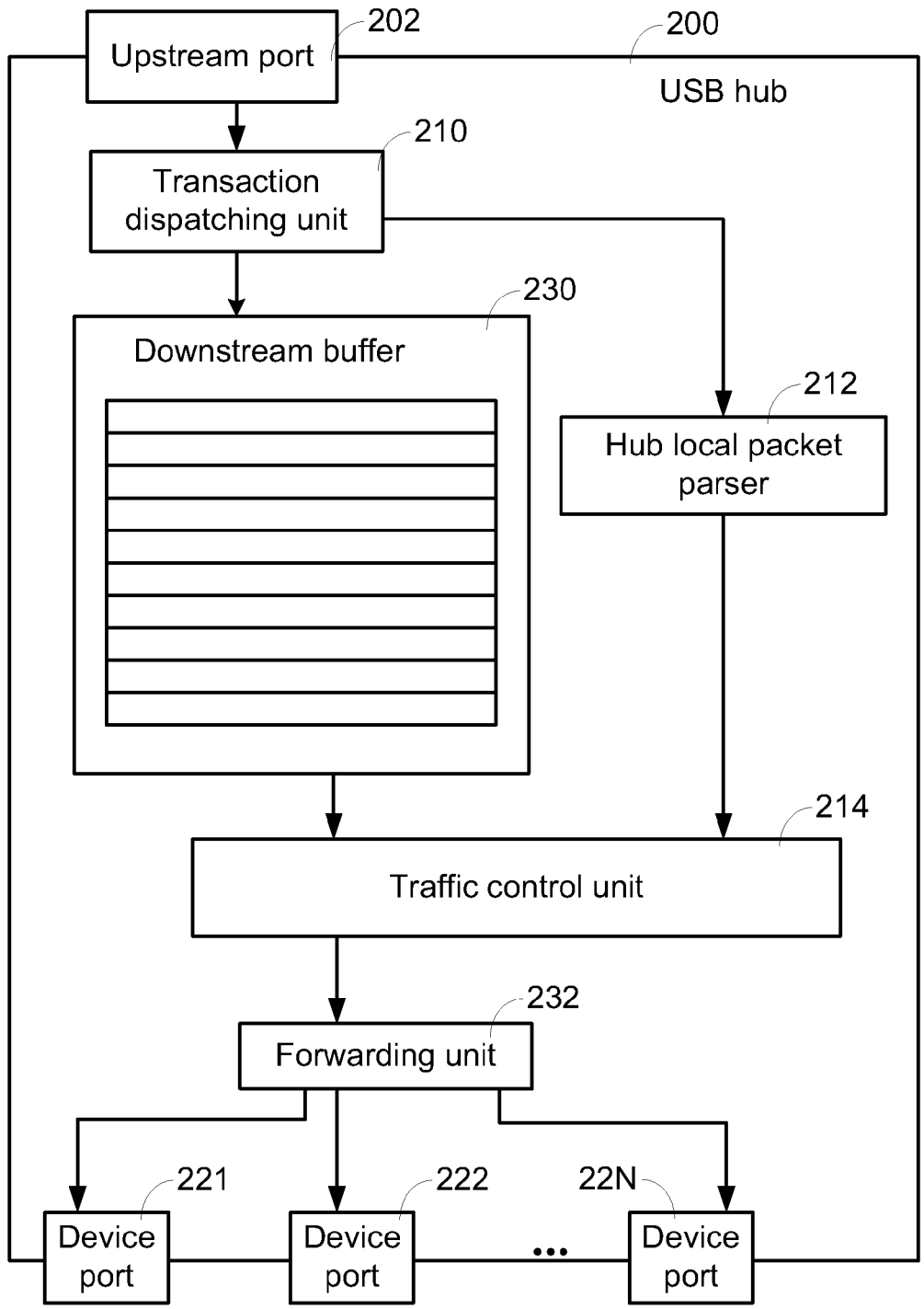
FIG. 2 is a schematic functional diagram illustrating the architecture of a USB hub according to a first embodiment of the present invention.

FIG. 2 is a schematic functional diagram illustrating the architecture of a USB hub according to a first embodiment of the present invention. The USB hub 200 of the present invention is a USB 3.0 hub. The USB hub 200 comprises an upstream port 202, N device ports 221~22N, a transaction dispatching unit 210, a hub local packet parser 212, a traffic control unit 214, a downstream buffer 230, and a forwarding unit 232. The upstream port 202 is connected to a USB host such as a USB 3.0 host (not shown). The N device ports 221~22N are selectively connected to N USB devices (not shown). Furthermore, the USB hub 200 can temporarily block the downstream packet from being forwarded to a specified USB device or temporarily block the upstream packet from being forwarded to the USB host. Consequently, the traffic control of the USB hub 200 is achievable.

The USB 3.0 host can generate a new packet without the need of waiting for the transaction response from the USB device. That is, the USB 3.0 host can issue a plurality of packets in order to perform multiple transactions. The transaction dispatching unit 210 may receive a plurality of packets from the USB host. Moreover, according to the header of the packet, the transaction dispatching unit 210 may determine whether the packet is a downstream packet to be forwarded to the USB port or the packet is a hub command packet to be forwarded to the USB hub 200. If the transaction dispatching unit 210 confirms that the received packet is a downstream packet to be forwarded to a USB device, the downstream packet is temporarily stored in the downstream buffer 230. On the other hand, if the transaction dispatching unit 210 confirms that the received packet is a hub command packet to be forwarded to the USB hub 200, the hub command packet is sent to the hub local packet parser 212.

After the hub local packet parser 212 receives the hub command packet and confirms that the command of the packet is a traffic management command, the hub local packet parser 212 will issue control parameters to the traffic control unit 214. The control parameters comprise a selected target and a control mode. The selected target is any device port or the upstream port.

In this embodiment, the downstream packet in the downstream buffer 230 to be forwarded to the selected target (or the specified device port) can be controlled by the traffic control unit 214, so that the traffic management efficacy is enhanced. Moreover, after the downstream packet is received by the forwarding unit 232, the downstream packet is forwarded to the USB device that is connected with the specified device port.

In other words, if a plurality of downstream packets are temporarily stored in the downstream buffer 230, the traffic management of the traffic control unit 214 can limit the transaction of the USB device which is connected to the selected target (e.g. the specified device port).

Figure 3A:
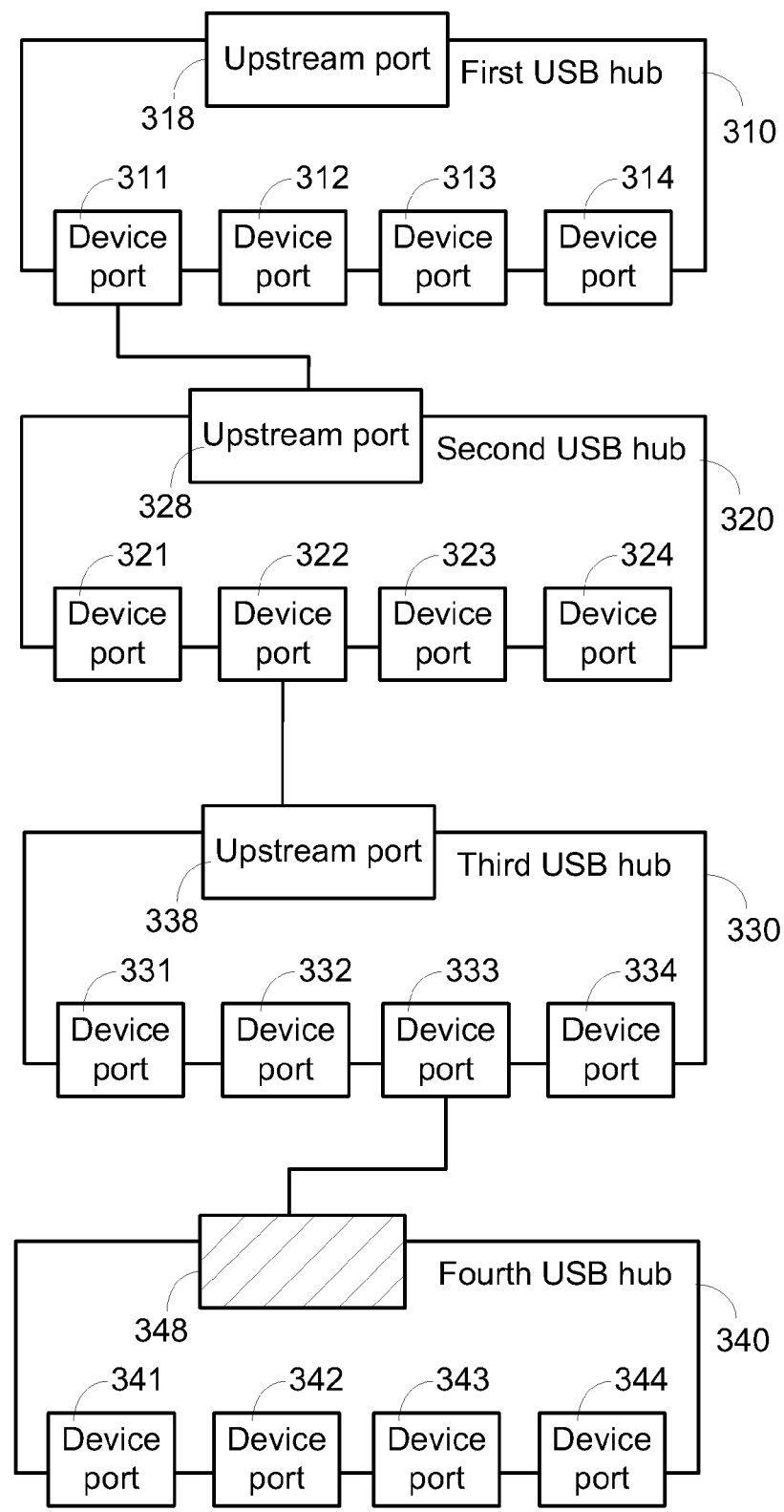
FIGS. 3A and 3B schematically illustrate two exemplary ways of determining the selected target.
Figure 3B:
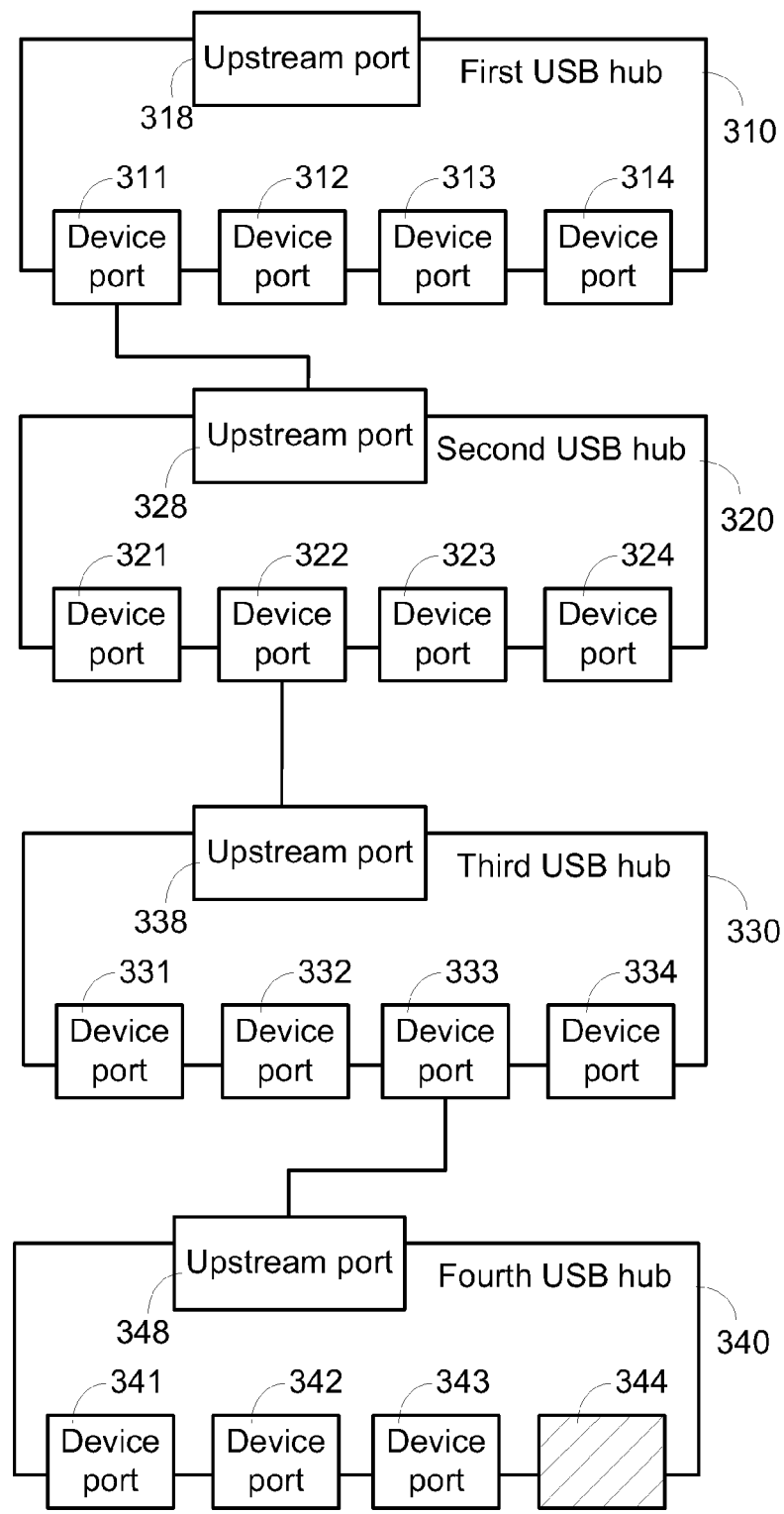

FIGS. 3A and 3B schematically illustrate two exemplary ways of determining the selected target. As shown in FIGS. 3A and 3B, four USB hubs are connected with each other in series. Each of the four USB hubs 310, 320, 330 and 340 comprises four device ports. The upstream port 318 of the first USB hub 310 is connected to the USB host. The upstream port 328 of the second USB hub 320 is connected to the first device port 311 of the first USB hub 310. The upstream port 338 of the third USB hub 330 is connected to the second device port 322 of the second USB hub 320. The upstream port 348 of the fourth USB hub 340 is connected to the third device port 333 of the third USB hub 330.

Basically, the selected target is determined by the USB host according to a route string rule. For example, in a route string [0xdcba], the symbol "a" denotes the device port code of the first USB hub 310, the symbol "b" denotes the device port code of the second USB hub 320, the symbol "c" denotes the device port code of the third USB hub 330, and the symbol "d" denotes the device port code of the fourth USB hub 340. Moreover, if the symbol "a", "b", "c" or "d" is 0, this symbol denotes the upstream port of the corresponding USB hub.

In FIG. 3A, it is assumed that the header of the hub command packet from the USB host contains an indicator [0x0321]. The last number "1" indicates that the first device port 311 of the first USB hub 310 is connected to the second USB hub 320. The last second number "2" indicates that the second device port 322 of the second USB hub 320 is connected to the third USB hub 330. The last third number "3" indicates that the third device port 333 of the third USB hub 330 is connected to the fourth USB hub 340. The last fourth number "0" denotes the upstream port 348 of the fourth USB hub 340. That is, the selected target is the upstream port 348 of the fourth USB hub 340. Similarly, in FIG. 3B, it is assumed that the header of the hub command packet from the USB host contains an indicator [0x4321]. According to the above rules, the selected target is the fourth device port 344 of the fourth USB hub 340.

In a case that the selected target is the upstream port 348 of the fourth USB hub 340, the data mount of the packet flowing through the upstream port 348 of the fourth USB hub 340 is correspondingly controlled. In a case that the selected target is the fourth device port 344 of the fourth USB hub 340, the data amount of the packet flowing through the fourth device port 344 of the fourth USB hub 340 is correspondingly controlled.

After the selected target is determined, the traffic control unit 214 starts the traffic management. In addition to the selected target, the parameter of the traffic management command further comprises the control mode. The control mode used in the prevent invention includes a maximum bandwidth mode, a minimum bandwidth mode and a block time detecting mode.

Figure 4A:
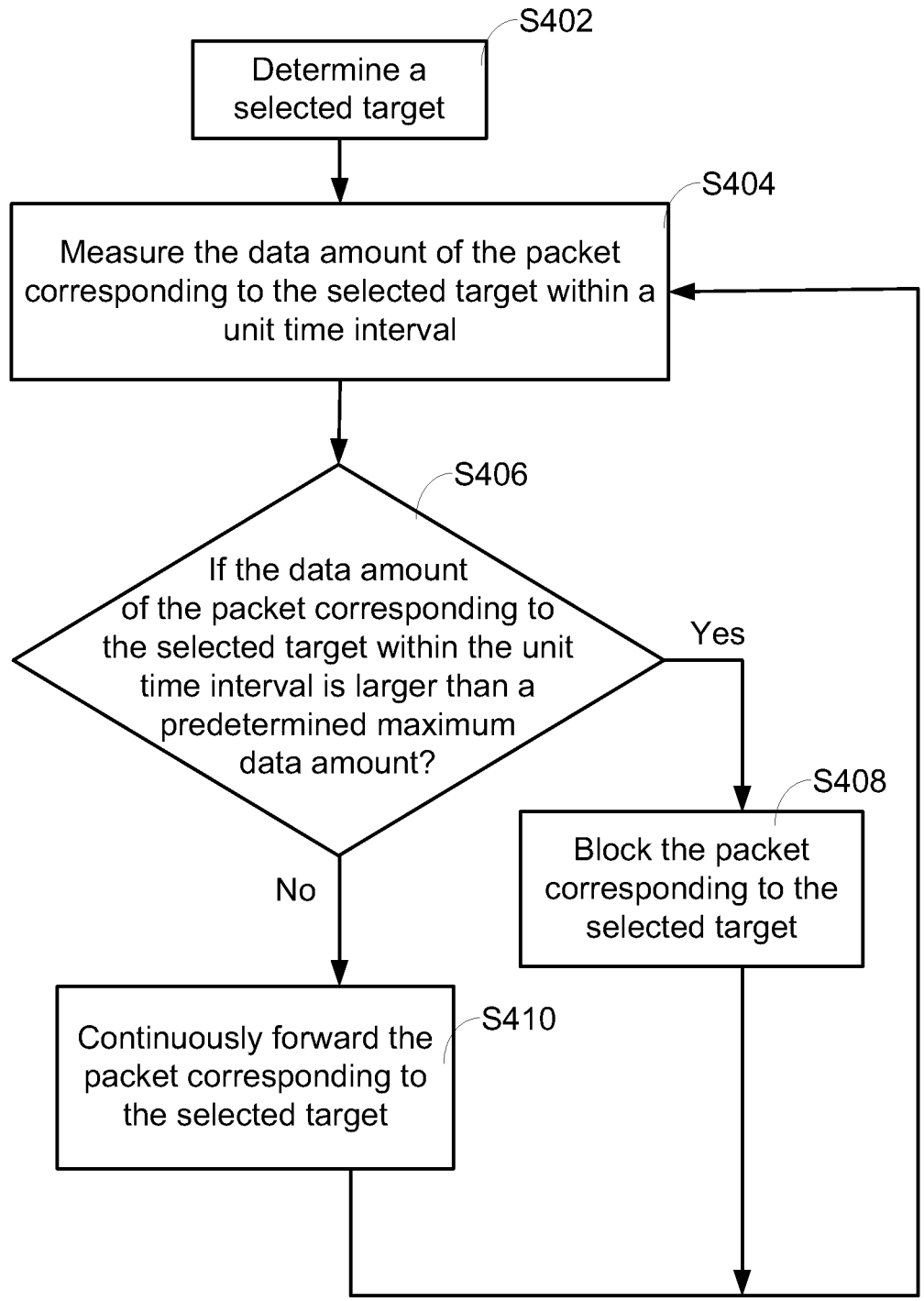
FIG. 4A is a flowchart illustrating a traffic management method of the USB hub in the maximum bandwidth mode.

FIG. 4A is a flowchart illustrating a traffic management method of the USB hub in the maximum bandwidth mode. Firstly, a selected target is determined (Step S402). Then, the data amount of the packet corresponding to the selected target within a unit time interval (e.g. 10 ms) is measured (Step S404). If the data amount of the packet corresponding to the selected target within the unit time interval is larger than a predetermined maximum data amount (Step S406), the packet corresponding to the selected target is blocked (Step S408). On the other hand, if the data amount of the packet corresponding to the selected target within the unit time interval is not larger than the predetermined maximum data amount (Step S406), the packet corresponding to the selected target is continuously forwarded (Step S410). After the step S408 or S410 is done, the Step S404 is performed again to measure the data amount of the packet corresponding to the selected target within a next unit time interval.

From the above discussions in FIG. 4A, the maximum bandwidth mode limits the maximum data amount of the selected target to be lower than the predetermined maximum data amount. If the data amount of the packet corresponding to the selected target within the unit time interval is larger than the predetermined maximum data amount, the packet corresponding to the selected target in the downstream buffer 230 is blocked by the traffic control unit 214. Consequently, the data amount of the packet flowing through the selected target is controlled to be smaller than the maximum allowable data amount.

Figure 4B:
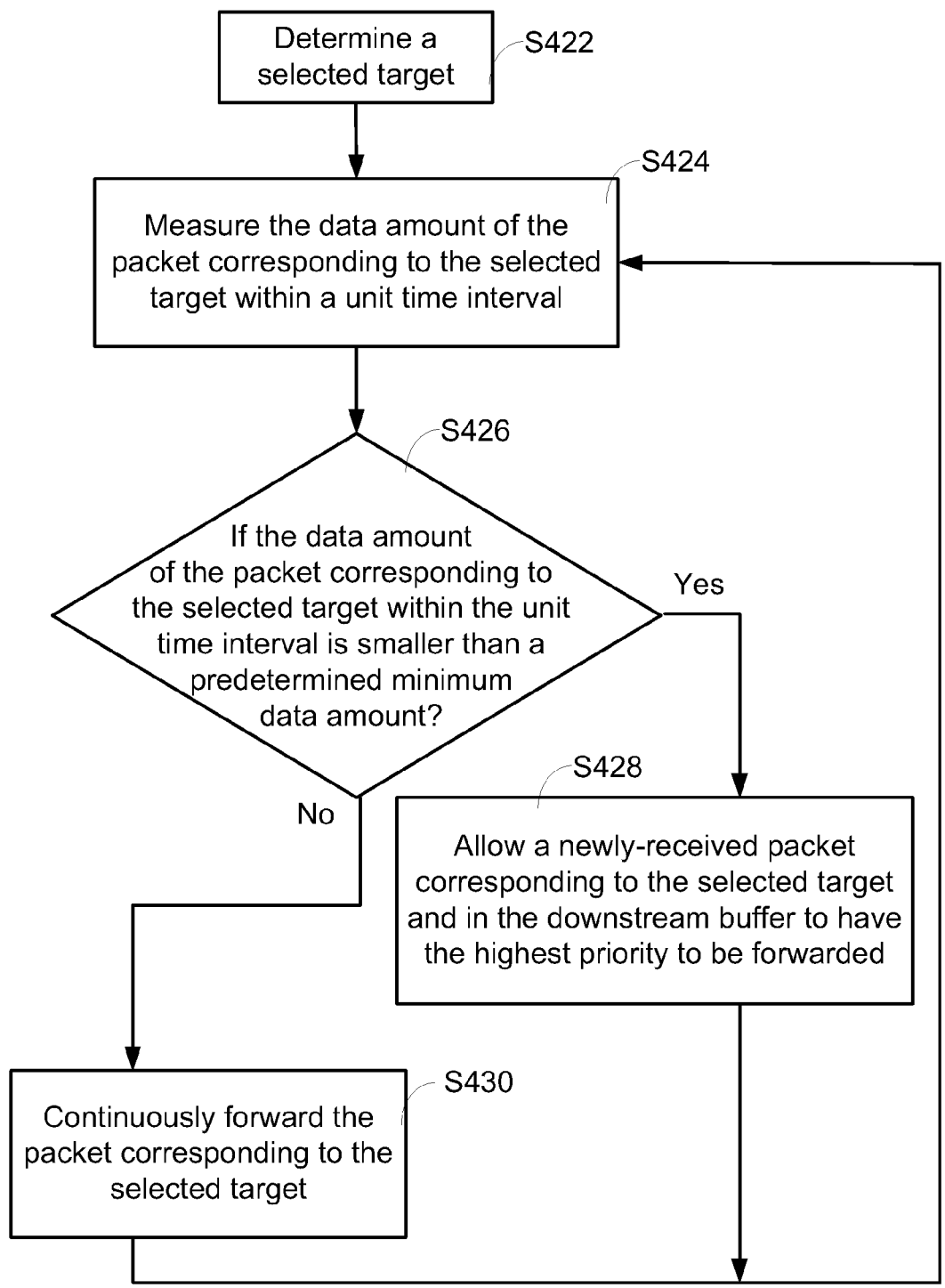
FIG. 4B is a flowchart illustrating a traffic management method of the USB hub in the minimum bandwidth mode.

FIG. 4B is a flowchart illustrating a traffic management method of the USB hub in the minimum bandwidth mode. Firstly, a selected target is determined (Step S422). Then, the data amount of the packet corresponding to the selected target within a unit time interval (e.g. 10 ms) is measured (Step S424). If the data amount of the packet corresponding to the selected target within the unit time interval is smaller than a predetermined minimum data amount (Step S426), a newly-received packet corresponding to the selected target and in the downstream buffer has the highest priority to be forwarded (Step S428). On the other hand, if the data amount of the packet corresponding to the selected target within the unit time interval is not smaller than a predetermined minimum data amount (Step S426), the packet corresponding to the selected target is continuously forwarded (Step S430). After the step S428 or S430 is done, the Step S424 is performed again to measure the data amount of the packet corresponding to the selected target within a next unit time interval.

From the above discussions in FIG. 4B, the minimum bandwidth mode limits the minimum data amount of the selected target to be higher than the predetermined minimum data amount. If the data amount of the selected target within the unit time interval is larger than the predetermined minimum data amount, the packet flowing through the selected target is continuously forwarded. Consequently, the data amount of the packet flowing through the selected target is controlled to be larger than the predetermined minimum data amount. If the data amount of the selected target within the unit time interval is not larger than the predetermined minimum data amount, it means that the packet corresponding to the selected target is no longer stored in the downstream buffer 230. Consequently, as soon as a newly-received packet corresponding to the selected target is included in the downstream buffer 230, the newly-received packet corresponding to the selected target has the highest priority to be forwarded. Consequently, the data amount of the packet flowing through the selected target is controlled to be larger than the predetermined minimum data amount.

Figure 4C:
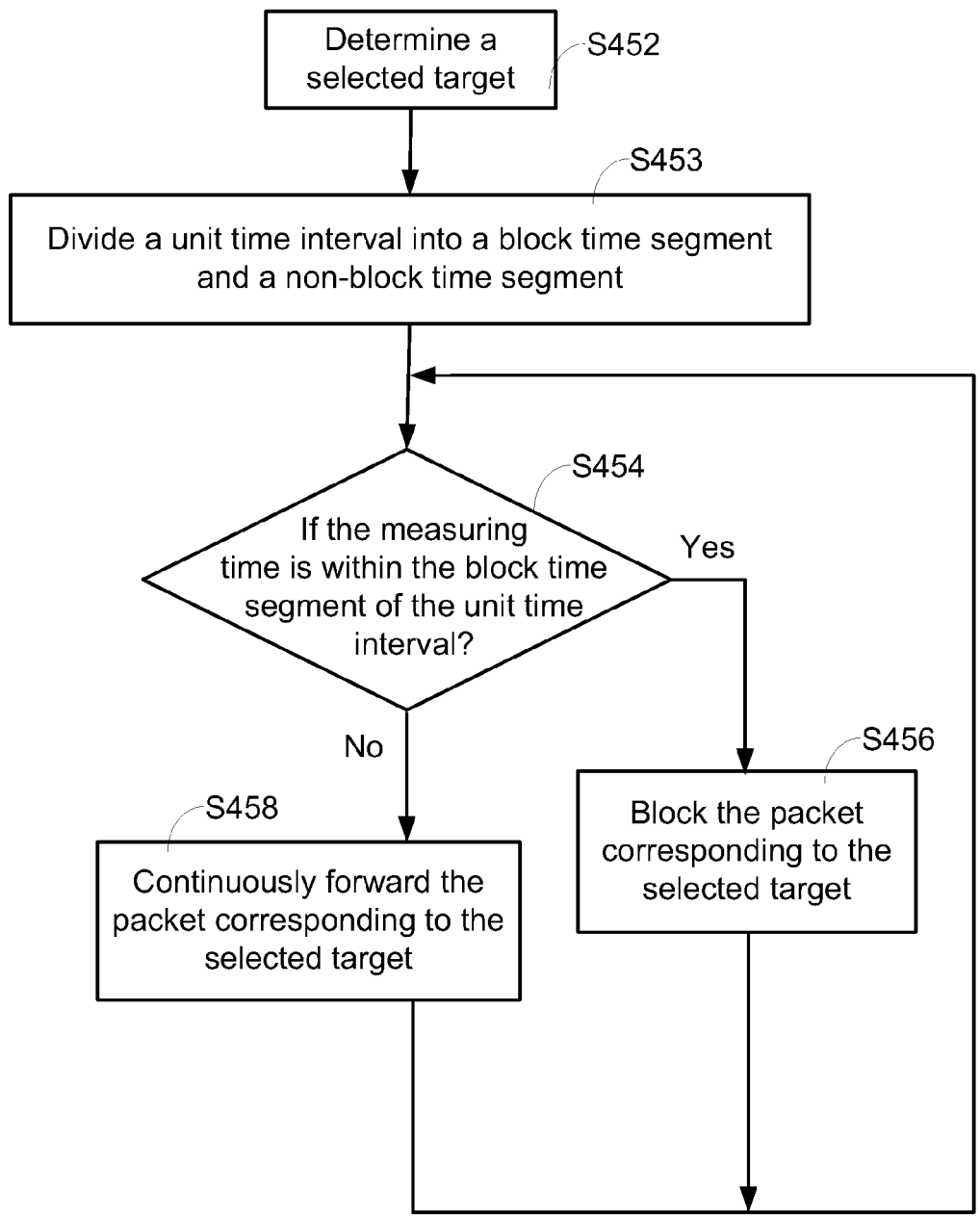
FIG. 4C is a flowchart illustrating a traffic management method of the USB hub in the block time detecting mode.

FIG. 4C is a flowchart illustrating a traffic management method of the USB hub in the block time detecting mode. Firstly, a selected target is determined (Step S452). The, a unit time interval (e.g. 10 ms) is divided into a block time segment (e.g. 7 ms) and a non-block time segment (e.g. 3 ms) (Step S453). If the measuring time is within the block time segment of the unit time interval (Step S454), the packet corresponding to the selected target is blocked (Step S456). On the other hand, if the measuring time is not within the block time segment of the unit time interval (Step S454), the packet corresponding to the selected target is continuously forwarded (Step S458). After the step S456 or S458 is done, the Step S454 is performed again to count a next unit time interval.

From the above discussions in FIG. 4C, in the block time detecting mode, a unit time interval is divided into a block time segment and a non-block time segment. The packet corresponding to the selected target is allowed to be forwarded during the non-block time segment of the unit time interval unit time interval. That is, the data amount of the packet corresponding to the selected target is controlled by the traffic control unit 214 according to the block time segment and the non-block time segment.

In the traffic management method of the first embodiment, the selected target is determined according to the traffic management command, and the data amount of the downstream packet is controlled according to the selected target. Moreover, the packets other than the packet corresponding to the selected target may be controlled in any manner. For example, the packets other than the packet corresponding to the selected target may be outputted from the downstream buffer in a FIFO (first in, first out) manner without the need of limiting the flow rate.

Figure 5:
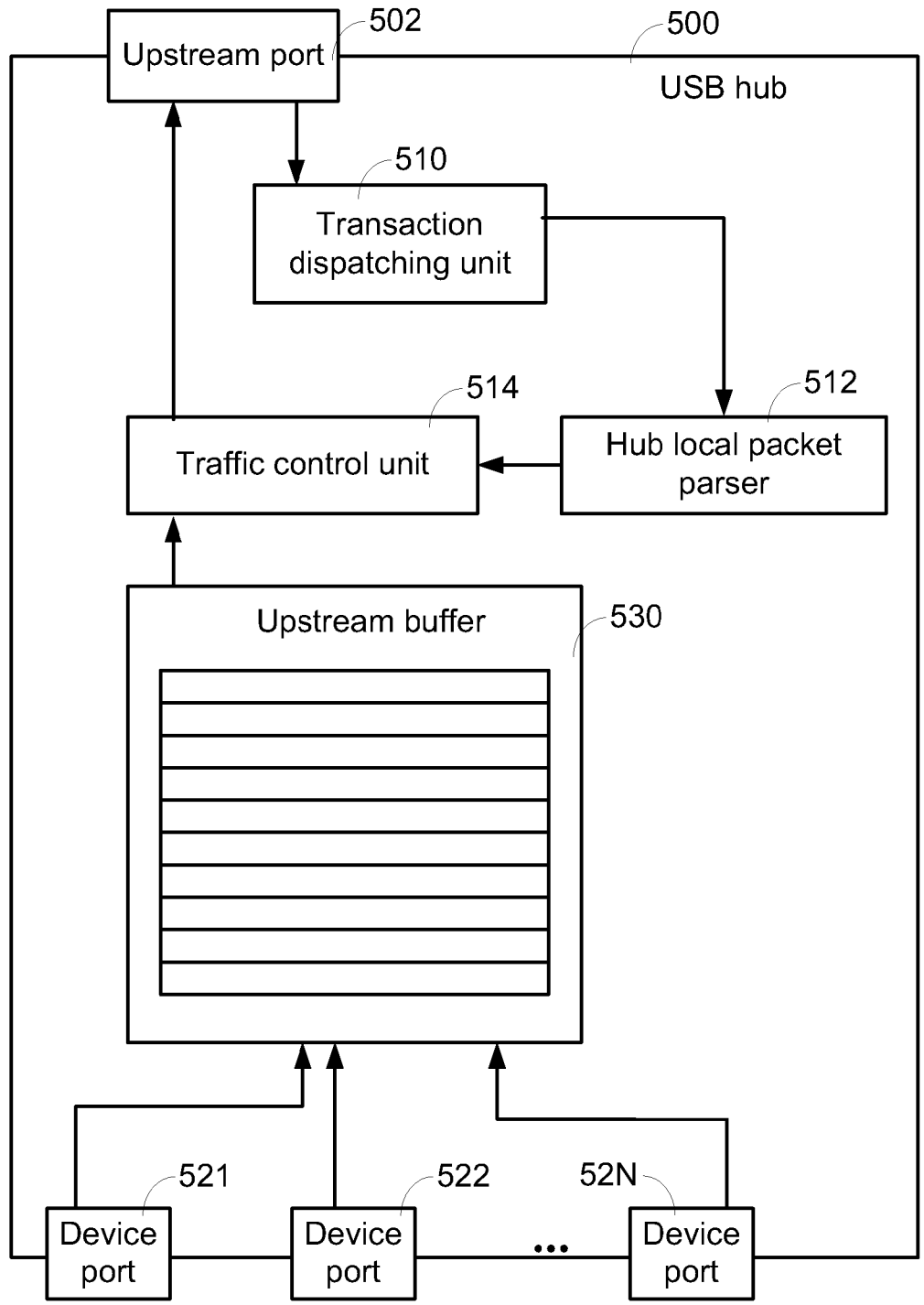
FIG. 5 is a schematic functional diagram illustrating the architecture of a USB hub according to a second embodiment of the present invention.

FIG. 5 is a schematic functional diagram illustrating the architecture of a USB hub according to a second embodiment of the present invention. The USB hub 500 of the present invention is a USB 3.0 hub. The USB hub 500 comprises an upstream port 502, N device ports 521~52N, a transaction dispatching unit 510, a hub local packet parser 512, a traffic control unit 514, and an upstream buffer 530. The upstream port 502 is connected to a USB host such as a USB 3.0 host (not shown). The N device ports 521~52N are selectively connected to N USB devices (not shown). Furthermore, the USB hub 500 can be used to control the upstream packet to be transmitted upstream to USB host. Consequently, the traffic control of the USB hub 500 is achievable.

Similarly, in response to the traffic management command from the USB host, the transaction dispatching unit 510 may determine the selected target and the control mode and perform the traffic control according to the selected target and the control mode. The selected target is any device port or the upstream port. The way of determining the selected target selected target is similar to that of the first embodiment, and is not redundantly described herein.

In this embodiment, the upstream packets from all USB devices are temporarily stored in the upstream buffer 530. In this embodiment, the upstream packet in the traffic control unit 514 and from the selected target (or the specified device port) can be controlled by the traffic control unit 514, so that the traffic management efficacy is achieved. In other words, if a plurality of downstream packets are temporarily stored in the upstream buffer 530, the traffic management of the traffic control unit 514 can limit the transaction of the USB device corresponding to the selected target (e.g. the specified device port). Consequently, the traffic control of the USB hub 500 is achievable.

After the selected target is determined, the traffic control unit 514 starts the traffic management. In addition to the selected target, the parameter of the traffic management command further comprises the control mode. The control mode used in the prevent invention includes a maximum bandwidth mode, a minimum bandwidth mode and a block time detecting mode. The traffic management method in the maximum bandwidth mode, the minimum bandwidth mode or the block time detecting mode is similar to that of the first embodiment, and is not redundantly described herein.

In the traffic management method of the second embodiment, the selected target is determined according to the traffic management command, and the data amount of the upstream packet is controlled according to the selected target.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A super speed USB hub connected between a USB host and a plurality of USB devices, the super speed USB hub comprising:
    an upstream port connected to the USB host;
    a plurality of device ports connected to the plurality of USB devices, respectively;
    a transaction dispatching unit, connected to the upstream port, for receiving a plurality of packets from the USB host, wherein the plurality of packets comprise a plurality of downstream packets and a hub command packet, and the transaction dispatching unit determines whether the plurality of packets are the plurality of downstream packets or the hub command packet;
    a downstream buffer, connected to the transaction dispatching unit, for temporarily storing the plurality of downstream packets from the transaction dispatching unit;
    a hub local packet parser, connected to the transaction dispatching unit, for receiving the hub command packet from the transaction dispatching unit, wherein if the hub command packet contains a traffic management command, the hub local packet parser generates a selected target and a control mode according to the traffic management command;
    a traffic control unit, connected to the downstream buffer and the hub local packet parser, for managing a downstream packet corresponding to the selected target among the plurality of downstream packets in the downstream buffer according to the selected target and the control mode; and
    a forwarding unit, connected to the traffic control unit and the plurality of device ports, for forwarding the plurality of downstream packets from the traffic control unit to corresponding device ports.

2. The super speed USB hub as claimed in claim 1, wherein the control mode is a maximum bandwidth mode, wherein if a data amount of the downstream packet corresponding to the selected target within a unit time interval is larger than a predetermined maximum data amount, the downstream packet corresponding to the selected target is blocked, wherein if the data amount of the downstream packet corresponding to the selected target within the unit time interval is not larger than the predetermined maximum data amount, the downstream packet corresponding to the selected target is continuously forwarded.

3. The super speed USB hub as claimed in claim 1, wherein the control mode is a minimum bandwidth mode, wherein if a data amount of the downstream packet corresponding to the selected target within a unit time interval is not smaller than a predetermined minimum data amount, the downstream packet corresponding to the selected target is continuously forwarded, wherein if the data amount of the downstream packet corresponding to the selected target within the unit time interval is smaller than the predetermined minimum data amount, a newly-received downstream packet corresponding to the selected target and in the downstream buffer has the highest priority to be forwarded.

4. The super speed USB hub as claimed in claim 1, wherein the control mode is a block time detecting mode, wherein during a block time segment of a unit time interval, the downstream packet corresponding to the selected target is blocked, wherein during a non-block time segment of the unit time interval, the downstream packet corresponding to the selected target is forwarded.

5. A traffic management method for a super speed USB hub, the traffic management method comprising steps of:
    receiving a hub command packet;
    analyzing the hub command packet, thereby determining a selected target and a control mode;
    temporarily storing a plurality of downstream packets into a downstream buffer; and
    managing a downstream packet corresponding to the selected target among the plurality of downstream packets in the downstream buffer according to the control mode, wherein the control mode is a maximum bandwidth mode, and the step of managing the downstream packet corresponding to the selected target comprises sub-steps of:
    measuring a data amount of the downstream packet corresponding to the selected target within a unit time interval;
    if the data amount of the downstream packet corresponding to the selected target within the unit time interval is larger than a predetermined maximum data amount, blocking the downstream packet corresponding to the selected target; and
    if the data amount of the downstream packet corresponding to the selected target within the unit time interval is not larger than the predetermined maximum data amount, continuously forwarding the downstream packet corresponding to the selected target.

6. The traffic management method as claimed in claim 5, wherein the control mode is a minimum bandwidth mode, and the step of managing the downstream packet corresponding to the selected target comprises sub-steps of:
    measuring a data amount of the downstream packet corresponding to the selected target within a unit time interval;
    if the data amount of the downstream packet corresponding to the selected target within the unit time interval is not smaller than a predetermined minimum data amount, continuously forwarding the downstream packet corresponding to the selected target; and
    if the data amount of the downstream packet corresponding to the selected target within the unit time interval is smaller than the predetermined minimum data amount, allowing a newly-received downstream packet corresponding to the selected target and in the downstream buffer to have the highest priority to be forwarded.

7. A traffic management method for a super speed USB hub, the traffic management method comprising steps of:
receiving a hub command packet;
analyzing the hub command packet, thereby determining a selected target and a control mode;
temporarily storing a plurality of downstream packets into a downstream buffer; and
managing a downstream packet corresponding to the selected target among the plurality of downstream packets in the downstream buffer according to the control mode, wherein the control mode is a block time detecting mode, and the step of managing the downstream packet corresponding to the selected target comprises sub-steps of:
setting a block time segment and a non-block time segment of an unit time interval; and
selectively blocking or forwarding the downstream packet corresponding to the selected target, wherein during the block time segment of the unit time interval, the downstream packet corresponding to the selected target is blocked, wherein during the non-block time segment of the unit time interval, the downstream packet corresponding to the selected target is forwarded.

8. The traffic management method as claimed in claim 7, wherein the control mode is a minimum bandwidth mode, and the step of managing the downstream packet corresponding to the selected target comprises sub-steps of:
measuring a data amount of the downstream packet corresponding to the selected target within a unit time interval;
if the data amount of the downstream packet corresponding to the selected target within the unit time interval is not smaller than a predetermined minimum data amount, continuously forwarding the downstream packet corresponding to the selected target; and
if the data amount of the downstream packet corresponding to the selected target within the unit time interval is smaller than the predetermined minimum data amount, allowing a newly-received downstream packet corresponding to the selected target and in the downstream buffer to have the highest priority to be forwarded.

9. A super speed USB hub connected between a USB host and a plurality of USB devices, the super speed USB hub comprising:
an upstream port connected to the USB host;
a plurality of device ports connected to the plurality of USB devices, respectively;
a transaction dispatching unit, connected to the upstream port, for receiving a hub command packet from the USB host;
an upstream buffer, connected to the plurality of device ports, for temporarily storing a plurality of upstream packets from the plurality of USB devices;
a hub local packet parser, connected to the transaction dispatching unit, for receiving the hub command packet, wherein if the hub command packet contains a traffic management command, the hub local packet parser generates a selected target and a control mode according to the traffic management command; and
a traffic control unit, connected to the hub local packet parser, the upstream port and the upstream buffer, for managing an upstream packet corresponding to the selected target among the plurality of upstream packets in the upstream buffer according to the selected target and the control mode.

10. The super speed USB hub as claimed in claim 9, wherein the control mode is a maximum bandwidth mode, wherein if a data amount of the upstream packet corresponding to the selected target within a unit time interval is larger than a predetermined maximum data amount, the upstream packet corresponding to the selected target is blocked, wherein if the data amount of the upstream packet corresponding to the selected target within the unit time interval is not larger than the predetermined maximum data amount, the upstream packet corresponding to the selected target is continuously forwarded.

11. The super speed USB hub as claimed in claim 9, wherein the control mode is a minimum bandwidth mode, wherein if a data amount of the upstream packet corresponding to the selected target within a unit time interval is not smaller than a predetermined minimum data amount, the upstream packet corresponding to the selected target is continuously forwarded, wherein if the data amount of the upstream packet corresponding to the selected target within the unit time interval is smaller than the predetermined minimum data amount, a newly-received upstream packet corresponding to the selected target and in the upstream buffer has the highest priority to be forwarded.

12. The super speed USB hub as claimed in claim 9, wherein the control mode is a block time detecting mode, wherein during a block time segment of a unit time interval, the upstream packet corresponding to the selected target is blocked, wherein during a non-block time segment of the unit time interval, the upstream packet corresponding to the selected target is forwarded.

13. A traffic management method for a super speed USB hub, the traffic management method comprising steps of:
receiving a hub command packet;
analyzing the hub command packet, thereby determining a selected target and a control mode;
temporarily storing a plurality of upstream packets into an upstream buffer; and
managing an upstream packet corresponding to the selected target among the plurality of upstream packets in the upstream buffer according to the control mode, wherein the control mode is a maximum bandwidth mode, and the step of managing the upstream packet corresponding to the selected target comprises sub-steps of:
measuring a data amount of the upstream packet corresponding to the selected target within a unit time interval;
if the data amount of the upstream packet corresponding to the selected target within the unit time interval is larger than a predetermined maximum data amount, blocking the upstream packet corresponding to the selected target; and
if the data amount of the upstream packet corresponding to the selected target within the unit time interval is not larger than the predetermined maximum data amount, continuously forwarding the upstream packet corresponding to the selected target.

14. The traffic management method as claimed in claim 13, wherein the control mode is a minimum bandwidth mode, and the step of managing the upstream packet corresponding to the selected target comprises sub-steps of:
measuring a data amount of the upstream packet corresponding to the selected target within a unit time interval;
if the data amount of the upstream packet corresponding to the selected target within the unit time interval is not smaller than a predetermined minimum data amount, continuously forwarding the upstream packet corresponding to the selected target; and if the data amount of the upstream packet corresponding to the selected target within the unit time interval is smaller than the predetermined minimum data amount, allowing a newly-received upstream packet corresponding to the selected target and in the upstream buffer to have the highest priority to be forwarded.

15. A traffic management method for a super speed USB hub, the traffic management method comprising steps of:

receiving a hub command packet;

analyzing the hub command packet, thereby determining a selected target and a control mode;

temporarily storing a plurality of upstream packets into an upstream buffer; and managing an upstream packet corresponding to the selected target among the plurality of upstream packets in the upstream buffer according to the control mode, wherein the control mode is a block time detecting mode, and the step of managing the upstream packet corresponding to the selected target comprises sub-steps of:

setting a block time segment and a non-block time segment of an unit time interval; and selectively blocking or forwarding the upstream packet corresponding to the selected target, wherein during the block time segment of the unit time interval, the upstream packet corresponding to the selected target is blocked, wherein during the non-block time segment of the unit time interval, the upstream packet corresponding to the selected target is forwarded.

16. The traffic management method as claimed in claim 15, wherein the control mode is a minimum bandwidth mode, and the step of managing the upstream packet corresponding to the selected target comprises sub-steps of:

measuring a data amount of the upstream packet corresponding to the selected target within a unit time interval;

if the data amount of the upstream packet corresponding to the selected target within the unit time interval is not smaller than a predetermined minimum data amount, continuously forwarding the upstream packet corresponding to the selected target; and if the data amount of the upstream packet corresponding to the selected target within the unit time interval is smaller than the predetermined minimum data amount, allowing a newly-received upstream packet corresponding to the selected target and in the upstream buffer to have the highest priority to be forwarded.

* * * * *